(12) United States Patent
Dewulf et al.

(10) Patent No.: US 11,005,086 B2
(45) Date of Patent: May 11, 2021

(54) FEEDTHROUGH FORMING A TERMINAL FOR AN ELECTROCHEMICAL METAL-ION BATTERY AND ASSOCIATED BATTERY

(71) Applicant: COMMISSARIAT A L'ENERGIE ATOMIQUE ET AUX ENERGIES ALTERNATIVES, Paris (FR)

(72) Inventors: Frédéric Dewulf, Voiron (FR); Pierre Jost, Saint-Pierre-Demesage (FR); Côme-Emmanuel Leys, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 174 days.

(21) Appl. No.: 16/329,840

(22) PCT Filed: Sep. 1, 2017

(86) PCT No.: PCT/EP2017/071951
§ 371 (c)(1),
(2) Date: Mar. 1, 2019

(87) PCT Pub. No.: WO2018/046397
PCT Pub. Date: Mar. 15, 2018

(65) Prior Publication Data
US 2019/0245188 A1    Aug. 8, 2019

(30) Foreign Application Priority Data
Sep. 7, 2016 (FR) ...................................... 1658288

(51) Int. Cl.
*H01M 2/30* (2006.01)
*H01M 2/20* (2006.01)
(Continued)

(52) U.S. Cl.
CPC .............. *H01M 2/30* (2013.01); *H01G 11/66* (2013.01); *H01M 2/06* (2013.01); *H01M 2/20* (2013.01); *H01M 10/0525* (2013.01)

(58) Field of Classification Search
CPC ............ H01M 2/30; H01M 2/20; H01M 2/06; H01M 10/0525; H01G 11/66
See application file for complete search history.

(56) References Cited

U.S. PATENT DOCUMENTS

2006/0292442 A1    12/2006  Shah et al.
2012/0058390 A1    3/2012   Obayashi et al.
(Continued)

FOREIGN PATENT DOCUMENTS

FR    2798227        3/2001
JP    H07-235289 A   9/1995
(Continued)

OTHER PUBLICATIONS

International Search Report corresponding International application PCT/EP2017/071951 dated Nov. 21, 2017, 4 pages.
(Continued)

*Primary Examiner* — Stewart A Fraser
(74) *Attorney, Agent, or Firm* — Cooper Legal Group, LLC; Ronald M. Kachmarik (57) ABSTRACT

A feedthrough that forms a terminal for a metal-ion electrochemical accumulator, provided through an aperture opening out on either side of a wall including two opposite faces. The includes feedthrough an electrically conductive male part, and a female part made of an aluminum-based alloy. A portion of the male part is tight-fitted into a blind hole of the female part.

14 Claims, 6 Drawing Sheets

(51) Int. Cl.
*H01G 11/66* (2013.01)
*H01M 2/06* (2006.01)
*H01M 10/0525* (2010.01)

(56) References Cited

U.S. PATENT DOCUMENTS

| | | | |
|---|---|---|---|
| 2015/0118547 A1* | 4/2015 | Dewulf | H01M 4/502 |
| | | | 429/179 |
| 2016/0020440 A1* | 1/2016 | Kesper | H01M 2/043 |
| | | | 429/158 |
| 2016/0226056 A1* | 8/2016 | Masson | H01M 2/30 |
| 2017/0092907 A1* | 3/2017 | Hyung | H01M 2/30 |
| 2017/0162838 A1* | 6/2017 | Revirand | H01M 10/0525 |
| 2019/0044107 A1 | 2/2019 | Ito | |

FOREIGN PATENT DOCUMENTS

| | | |
|---|---|---|
| JP | 2000138055 | 5/2000 |
| JP | 2015-518254 A | 6/2015 |
| WO | 2017141694 | 8/2017 |

OTHER PUBLICATIONS

Japanese Office Action from corresponding Japanese Application No. 2019-533670, dated Mar. 3, 2020, 9 pgs.

* cited by examiner

FEEDTHROUGH FORMING A TERMINAL FOR AN ELECTROCHEMICAL METAL-ION BATTERY AND ASSOCIATED BATTERY

TECHNICAL FIELD

The present invention relates to a feedthrough forming a terminal for a metal-ion electrochemical accumulator, and to such an accumulator.

The invention relates more particularly to a lithium-ion (Li-ion) electrochemical accumulator with a high capacity, typically higher than 10 ampere-hours (Ah), and being suitable for the flow of large currents, typically larger than 100 A.

The invention relates more particularly to the production of a feedthrough for a housing allowing the high-capacity Li-ion accumulator fitted therewith to be able to deliver large currents.

It is specified that the term "feedthrough" is understood to have the usual meaning, i.e. a device used to pass an electrically conductive element through a wall while insulating the conductor from this wall.

Although described with reference to a lithium-ion accumulator, the invention is applicable to any metal-ion electrochemical accumulator, i.e. also sodium-ion, magnesium-ion, aluminum-ion, etc. accumulators.

PRIOR ART

A lithium-ion accumulator or battery usually includes at least one electrochemical cell consisting of a constituent electrolyte between a positive electrode or cathode and a negative electrode or anode, a current collector connected to the cathode, a current collector connected to the anode and, lastly, a casing suitable for containing the electrochemical cell in a sealtight manner even though a portion of the current collectors passes therethrough.

The constituent electrolyte may be a solid, liquid or gel. In the latter form, the constituent may comprise a separator made of a polymer or a microporous composite imbibed with organic or liquid-ionic electrolyte(s) that allow the lithium ion to move from the cathode to the anode for charging and vice versa for discharging, thereby generating the current. The electrolyte is in general a mixture of organic solvents, for example of carbonates, to which a lithium salt, typically $LiPF_6$, is added.

The positive electrode or cathode consists of materials for inserting the lithium cation, which are in general composites, such as $LiFePO_4$, $LiCoO_2$ or $LiNi_{0.33}Mn_{0.33}Co_{0.33}O_2$.

The negative electrode or anode very often consists of carbon graphite or is made of $Li_4TiO_5O_{12}$ (titanate material), though also optionally is based on silicon or on a silicon-based composite.

The current collector connected to the positive electrode is usually made of aluminum.

The current collector connected to the negative electrode is usually made of copper, nickel-plated copper or aluminum.

A lithium-ion accumulator or battery may of course includes a plurality of electrochemical cells, which are stacked on top of one another.

Conventionally, a Li-ion accumulator or battery uses a pair of materials at the anode and at the cathode that allows it to operate at a high voltage level, typically equal to 3.6 volts.

A Li-ion accumulator or battery includes a rigid casing when the target applications are demanding or a long service life is sought, when for example very high pressures are to be withstood and a more stringent sealtightness level (typically lower than $10^{-8}$ mbar·l/s) is required, or in highly demanding environments such as in the aerospace field.

Thus, to date, a rigid casing consists of a metal housing, typically made of stainless steel (316L or 304 stainless steel), of aluminum (1050 or 3003 aluminum) or of titanium.

Currently, two types of rigid housing are produced.

The first type consists of a rigid housing constructed with a machined bottom and a cover that are welded together at their periphery by laser. The current collectors are formed in part by metal wires or pins. The one or more pins are welded by electric welding or by ultrasound to the corresponding portion of the current collector that is itself connected to one of the electrodes of an electrochemical cell or of a stack of electrochemical cells. To produce the electrical insulation between the metal cover of the housing and the metal pin, a glass ball covers the pin, thus forming what is commonly called a glass-metal feedthrough. Furthermore, to make it sealtight with the housing cover, a ring around the glass ball, which is generally made from the same metal as that of the casing, is welded thereto. Some configurations provide for the use of a single glass-metal feedthrough, with the housing forming the other terminal also being called the pole of the accumulator.

The second type also consists of a rigid housing constructed with a stamped cup and a cover that are welded together at their periphery by laser. However, the current collectors comprise a feedthrough with a portion projecting from the top of the casing and forming what is called an emergent terminal, or pole, of the battery.

Figure 1:
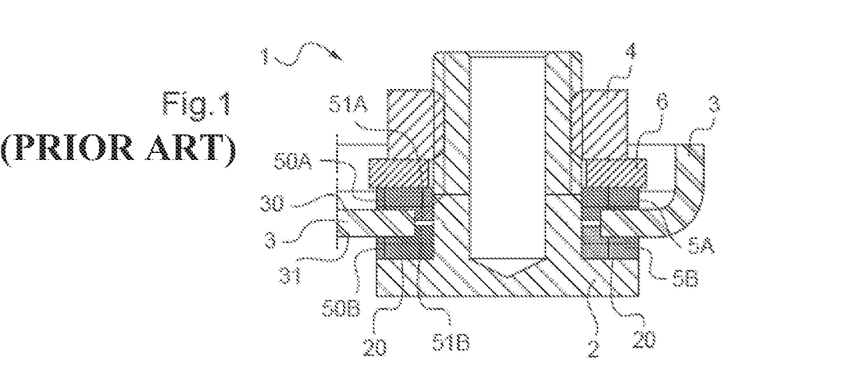
FIG. 1 is a view in axial section of a feedthrough forming a terminal of a Li-ion accumulator according to one example of the prior art.

A first example of an assembly of such a feedthrough 1 forming a terminal with the current collector 2 and with the cover 3 of a housing is shown in FIG. 1: the collector 2, typically made of copper in the shape of an internally threaded male part, is attached by screwing using an M5 or M8 nut 2. Two washers 5A, 5B made of an electrically insulating material, typically of polypropylene, and superposed over one another, are inserted with one 5A between the cover 3 and the other bearing washer 6 of the nut 4, and the other 5B between the cover 3 and the collector 2. These washers 5A, 5B seal and electrically insulate the collector 2 with respect to the cover 3 of the housing. More specifically, in this first illustrated example, the two insulating washers 5A, 5B are identical and each include a bearing portion 50A, 50B and a guide and centering portion 51A, 51B. The bearing portion 50A superficially bears with pressure both against the face 30 of the wall of the cover 3 and against the bearing washer 6 of the nut 4. Analogously, the bearing portion 50B superficially bears both against the opposite face 31 of the cover 3 and against the bearing portion 20 of the current collector 2. The guide and centering portions 51A, 51B are, for their part, in contact both with the edge of the through-aperture 32 in the cover 3 and with the collector 2. These guide and centering portions 51A, 51B allow both the washers 5A, 5B to be guided into and centered in the through-aperture 32 and the male collector 2 to be guided into and centered in said washers 5A, 5B.

Figure 2:
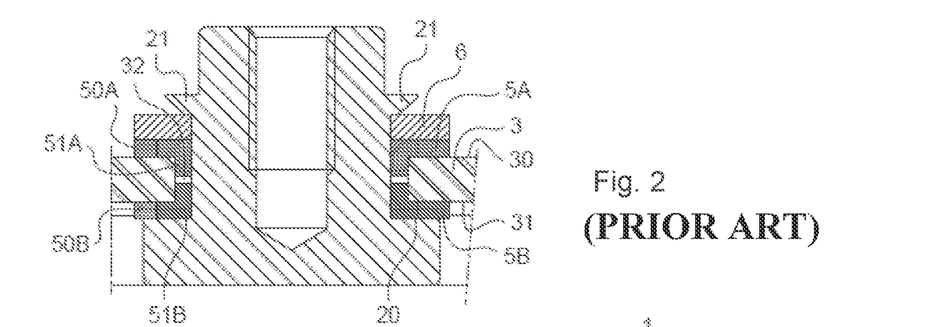
FIG. 2 is a view in axial section of a feedthrough forming a terminal of a Li-ion accumulator according to another example of the prior art.

A second example of an assembly of a feedthrough 1 forming a terminal with the current collector 2 and with the cover 3 of a housing is shown in FIG. 2: the collector 2, typically made of copper in the shape of an internally threaded male part, is attached by crimping the collector over the bearing washer 6. The two washers 5A, 5B made of electrically insulating material, with their bearing portions 50A, 50B and their guide and centering portions 51A, 51B, which are arranged in the same way and perform the same functions as in the first example, are also present here. However, the attachment by crimping according to this second example is carried out without using any additional part, such as the screwing nut 4 of the first example. Specifically, the crimping operation is carried out by mechanically crushing a crimping portion 21 that is arranged on the outside of the cylindrical portion of the collector 2 against the bearing washer 6.

A third example of an assembly of a feedthrough forming a terminal with the current collector and with the cover of a housing is described in the patent application FR 2798227.

As mentioned above, a Li-ion accumulator or battery uses a pair of materials at the anode and at the cathode that allows it to operate at a high voltage level, typically equal to 3.6 volts.

Other pairs of materials are possible and deliver a lower voltage level. By way of example, a $LiFePO_4$/graphite pair of materials delivers a mean voltage level during operation of between 3.0 and 3.2 volts. Also by way of example, a $LiFePO_4/Li_4TiO_5O_{12}$ pair of materials delivers a mean voltage level during operation of between 1.6 and 1.8 volts.

The solution proposed in the aforementioned application FR 2798227 is not suitable for large currents being passed therethrough, since doing so would result in a loss of contact by debonding between the male part and the female part as they heat up, causing thermal expansion, in particular because of the geometries of said parts, because of the absence of a laser welding, etc.

It is for this reason that the applicant has proposed, in the patent application FR 2989836, a Li-ion accumulator provided with a housing with connection terminals allowing very large currents, typically larger than 100 A, to be passed therethrough, with mean voltage levels that are lower than the 3.6 volts conventionally used. Specifically, for what are termed "power" applications, a high-capacity accumulator must deliver a very high power, i.e. a product of very high current and voltage, at its terminals. However, due to the use of pairs with lower voltage levels, it is necessary to deliver currents that are larger than what is conventional.

Figure 3:
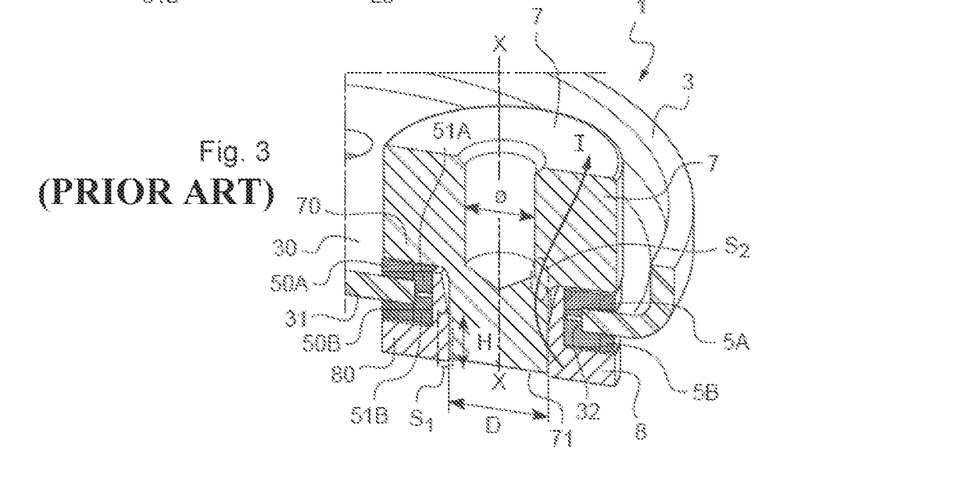
FIG. 3 is a view in axial section and in perspective of a feedthrough forming a terminal of a Li-ion accumulator according to yet another example of the prior art.

FIG. 3 shows an example of a feedthrough forming a terminal 1 of a Li-ion accumulator, according to the application FR 2989836.

The feedthrough 1 is produced through an aperture 32 opening out on either side of a cover 3 of a Li-ion accumulator. This cover includes two opposite faces 30, 31. The feedthrough 1 extends along an axis X that is parallel to the axis of the housing of the Li-ion accumulator.

The feedthrough 1 first includes two identical electrically insulating washers 5A, 5B. Each washer includes a bearing portion 50A, 50B and a guide portion 51A, 51B that protrudes with respect to the bearing portion. The bearing portion of the upper washer 5A superficially bears with pressure against the upper face 30 of the cover 3 and its guide portion 51A makes contact with the edge of the aperture 32 in the cover 3. Similarly, the bearing portion of the lower washer 5B superficially bears with pressure against the lower face 30 of the cover 3 and its guide portion 51B makes contact with the edge of the aperture 32 in the cover 3.

The feedthrough 1 includes an electrically conductive male part 7 that is tight-fitted into a female part 8 that is also conductive. The female part 8 is open-ended.

The male 7 and female parts each include a bearing portion 70, 80. The bearing portion 70 of the male part 7 superficially bears with pressure against the bearing portion 50A of the upper washer 5A, while the bearing portion 80 of the female part superficially bears with pressure against the bearing portion 50B of the lower washer 5B. As illustrated in FIG. 3, this female part 8 furthermore superficially bears with pressure due to its deformation against the guide portions 51A, 51B of the washers.

According to this application FR 2989836, the one or more materials of the male 7 and female 8 parts and the dimensions of the cross sections of said parts are chosen so as to allow an electric current having a value that is at least equal to 100 A to pass, which may be a direct current for a duration of a least 3 minutes. In FIG. 3, the black arrow represents the path of a current I that is higher than 100 A through the feedthrough 1 according to the application FR 2989836.

In general, the conductive parts of a feedthrough or sealtight terminal implemented in the known Li-ion accumulators, in particular in the aforementioned patent applications, are made of nickel-plated copper. This is due to the fact that such a feedthrough acts as the negative terminal of the accumulator and is hence electrically connected to the negative electrode, which very often comprises graphite as the active insertion material, which graphite is generally borne by coating on a copper foil. In other words, the nickel-plated copper of the conductive parts of the terminal is the material that is the most compatible with the copper foil of the negative electrode.

However, next-generation metal-ion accumulators make use of new types of active insertion materials, such as silicon, titanate or sodium. These materials may not only be satisfactorily coated on an aluminum substrate, such as an aluminum foil, but also, by selecting the purest possible aluminum grade for the inside of the accumulator, it is possible to avoid, through the use of said materials, the presence of pollutants and the formation of galvanic couples in the presence of the electrolyte, which may result in corrosion.

The inventors were thus confronted with the need to define a feedthrough for an accumulator having conductive parts that are at least partly made of aluminum so as to provide the best compatibility with an aluminum substrate, as a support, for new types of active insertion materials, such as silicon, titanate or sodium.

They naturally turned to the solution according to the application FR 2989836, using male and female parts made of aluminum.

However, under certain conditions for testing the assembly of these parts by crimping, they brought to light the fact that substantial deformations of the base of the female part may occur, especially with a marked increase in the diameter of the base of the female part related to the plasticity of aluminum under the pressure exerted in the step of crimping the male and female parts together.

There is therefore a need to improve the production of a sealtight feedthrough forming a terminal for a metal-ion electrochemical accumulator, through a housing of the accumulator, in particular with a view to having at least a portion of the conductive parts of the feedthrough made of aluminum so as to be able to use other active insertion materials for the one or more electrodes, in particular negative electrodes, of the accumulator, such as silicon, titanate or sodium, which may be borne by an aluminum substrate.

SUMMARY OF THE INVENTION

To achieve this, the invention relates, according to one of its aspects, to a feedthrough forming a terminal for a lithium-ion (Li-ion) electrochemical accumulator, provided through an aperture opening out on either side of a wall including two opposite faces, including:
- an electrically conductive male part; and
- a female part made of an aluminum-based alloy, a portion of the male part being tight-fitted into a blind hole of the female part.

The term "aluminum-based alloy" is understood to mean an alloy made almost entirely of aluminum, with, if appropriate, other elements, such as Si, Mn, Zn, Fe or Ti, in small proportion, typically smaller than 0.5%.

According to one advantageous embodiment, the feedthrough includes:
- two electrically insulating washers, each including a superficial bearing portion bearing against one of the faces of the wall and a guide portion protruding with respect to the bearing portion and making contact with the edge of the aperture, in which feedthrough each of the conductive parts includes a bearing portion superficially bearing against a bearing portion of the washers.

The insulating washers may be made of polyetherimide (PEI).

According to one particularly advantageous embodiment, the male part is made of an aluminum-based alloy that is different from that of the female part.

According to this embodiment, the aluminum alloy of the male part is preferably chosen from grade 5754, 6060 and 3003 alloys with an H18 temper, while the aluminum alloy of the female part is a grade 1050 alloy.

Thus, according to the invention, it is advantageously possible to provide a feedthrough with a pair of male and female parts that are both made of aluminum alloy but are distinct so as to be able to withstand the stresses to which these parts are subjected in an appropriate and individual manner. The male part is therefore made from an aluminum alloy that exhibits very good mechanical characteristics whereas the aluminum alloy of the female part is chosen for its chemical compatibility with the electrochemical core of a metal-ion accumulator.

For the male part, a grade 5754, grade 6060 or grade 3003 alloy with an H18 temper exhibits very good mechanical characteristics and retains its integrity when pressure is applied to its surface, in particular during the crimping according to the invention. Among these very good mechanical properties are high yield strength, which allows a tightening torque to be applied by screwing between the male part of the feedthrough and a busbar at a level that is equivalent to or even higher than that which can be applied to a copper-based terminal according to the prior art. Typically, the tightening torque that may be applied by screwing to an output terminal according to the invention is higher than 4 N·m.

Furthermore, grades 5754 and 6060 are directly compatible with a grade 1050 aluminum for the female part, thereby providing continuous electrical conduction at low electrical resistivity that is relatively close to that of grade 1050.

For a grade 3003 with an His temper, the Mg content may advantageously be between 0.01 and 0.05%, and the copper (Cu) content between 0.05 and 0.2%.

For a grade 5754, the Mg content may advantageously be between 2.6 and 3.2% and the copper (Cu) content between 0.05 and 0.1%.

For a grade 6060, the Mg content may advantageously be between 0.35 and 0.6% and the copper (Cu) content between 0.05 and 0.1%.

With regard to the female part, a grade 1050 is perfectly compatible with the materials of which the electrochemical core of a metal-ion accumulator may be formed, comprising the silicon-, titanate- or sodium-based active insertion materials, a $LiPF_6$-based electrolyte for a Li-ion accumulator, etc. Moreover, this aluminum grade is similar to that typically used for aluminum-based electrode foil and current collectors.

In other words, according to the invention, the same type of feedthrough as that according to the patent application FR 2989836 is produced, with the addition of the tight fitting between a protruding portion of the male part and a blind hole of the female part that is made of aluminum, preferably in the purest possible aluminum grade.

Producing a blind hole in the female part instead of a through-hole as in the application FR 2989836 allows the female part to be mechanically strengthened, which prevents any unwanted deformation during the crimping operation and hence ultimately allows a strong feedthrough to be obtained.

By virtue of the invention, it is possible to define a metal-ion accumulator with any insertion material borne by an aluminum foil that is electrically connected to the female part made of aluminum-based alloy of the terminal according to the invention.

The invention provides, in the first instance, a sealtight, mechanically strong feedthrough, i.e. a feedthrough having all of the following features:
- it does not deform during the steps of assembling the accumulator;
- it withstands a tightening torque (generally higher than 3 N·m) that allows the accumulator to be assembled together with other accumulators in the form of a module via connecting busbars;
- it is able to retain its integrity throughout the service life of an accumulator in its application, and hence withstand vibrations, mechanical impacts, variations in temperature that are typically between −40° C. and +75° C. and variations in pressure without unwanted deformation and without leaking.

Furthermore, since the base of the female part is solid, the male part no longer makes direct contact with the internal elements of the accumulator that take part in the electrochemistry thereof, perfect sealtightness furthermore being ensured between the female part and the wall of the accumulator that bears the feedthrough by means of the lower insulating washer.

The expression "perfect sealtightness" is understood to mean a sealtightness that is among the most stringent required, typically less than $10^{-8}$ mbar·l/s for helium.

Preferably, the tight fitting of the portion of the male part in the blind hole of the female part is a type N9p7 fitting, in particular for a bore diameter of the blind hole of the order of 6 mm. It is specified here that the N9p7 fitting under consideration is in accordance with the ISO system of fittings.

Advantageously, the one or more materials of the parts and the dimensions of the cross sections of the parts may be suitable for allowing an electric current up to a value that is at least equal to 100 A to pass.

According to one advantageous embodiment, the portion of the male part comprises at least one duct opening out both on the outside of the accumulator and on the bottom into the blind hole of the female part, in such a way as to let air out when crimping the male part into the female part.

This embodiment is advantageous because, under certain crimping conditions, the inventors observed that an incompressible airspace could remain, corresponding to a chamber located between the end of the male part and the bottom of the blind hole of the female part.

Now, the presence of this chamber may have the effect of preventing a completely tight fit from being obtained. Thus, the through-duct in the male part allows all of the air to be let out during crimping, the portion of the male part being able to achieve mechanical abutment against the bottom of the blind hole of the female part. Lastly, the presence of the duct allows the travel of insertion of the male part into the female part to be more precisely adjusted and hence the clearance between them after crimping to be minimized. This has the effect of better controlling the crimping force that has to be brought to bear and of improving the quality of the tight fit obtained between the two parts.

The through-duct may advantageously be made in the continuation of a central tapped hole in the male part. The duct may be made by drilling with a diameter of 1 to 2 mm when machining this male part.

According to another embodiment, the male part is made of a copper-based alloy, preferably of CuAl electrolytic copper or of nickel-plated copper.

Nickel-plated copper has the advantage of being of the same chemical nature as that defined for a conventional copper negative terminal, which may allow an identical interface with respect to a user to be retained, even if the electrochemistry of the accumulator differs from a conventional electrochemistry.

The invention also relates, according to yet another aspect, to a metal-ion accumulator or battery including a housing with a cover through which a feedthrough such as described above is produced.

According to one feature, the male part is an internally threaded part and protrudes toward the outside of the housing.

The cover may be made of aluminum, such as 1050 or 3003 aluminum.

According to one advantageous configuration, the female part of the feedthrough is welded to an aluminum-based current collector which is itself welded to an aluminum-based electrode foil bearing an active metal-ion insertion material, preferably chosen from a material based on titanate, such as lithium titanate oxide $Li_4TiO_5O_{12}$, a silicon-based material or a sodium-based material.

The invention lastly relates to a method for producing a feedthrough such as described above, in which the following steps are carried out:

a/ inserting, through the aperture, from each of the two opposite faces of the wall, one of the guide portions of the washers such that they bear against the edge of the aperture in the wall;

b/ inserting, from one face of the wall, the aluminum female part into one of the washers;

c/ press-fitting, from the opposite face of the wall, the male part such that the portion of the male part abuts against the bottom of the blind hole of the female part and each of the bearing portions of the male and female parts bears with pressure against a bearing portion of the washers that is itself guided against the edge of the aperture.

The press-fitting operation allowing the bearing with pressure to be obtained in step c/ is advantageously carried out by pressing with a force that is greater than or equal to 1 tonne-force so as to obtain a type N9p7 fitting between portion of male part and blind hole of female part, in particular for a bore diameter of the blind hole of the female part of the order of 6 mm.

DETAILED DESCRIPTION

Other advantages and features of the invention will become more clearly apparent on reading the detailed description of examples of implementation of the invention, given by way of nonlimiting illustration with reference to the following figures, in which.

FIGS. 1 to 5 relate to three different examples of a feedthrough forming a Li-ion accumulator terminal according to the prior art. These FIGS. 1 to 5 have already been discussed in the preamble and are therefore not discussed further below.

For the sake of clarity, the same references denoting the same elements of feedthroughs according to the prior art and according to the invention are used for all of the FIGS. 1 to 16.

Throughout the present application, the terms "lower", "upper", "down", "up", "bottom" and "top" are to be understood with reference to a metal-ion accumulator housing positioned vertically with its cover on top and the feedthrough protruding upward out of the housing.

Figure 6:
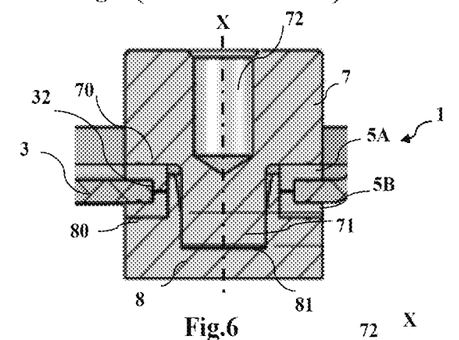
FIG. 6 is a view in axial section of a feedthrough forming a terminal of a metal-ion accumulator according to a first example of the invention.
Figure 7:
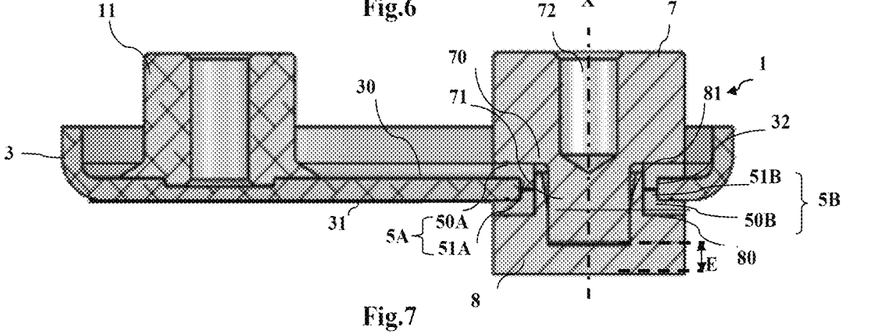
FIG. 7 is a view in axial section of a metal-ion accumulator cover according to the invention through which the feedthrough according to FIG. 6 is produced as the negative terminal, the positive terminal being, for its part, welded directly to the cover.

FIG. 6 shows a first example of a feedthrough forming a terminal 1 of a metal-ion accumulator, according to the invention.

Figure 4:
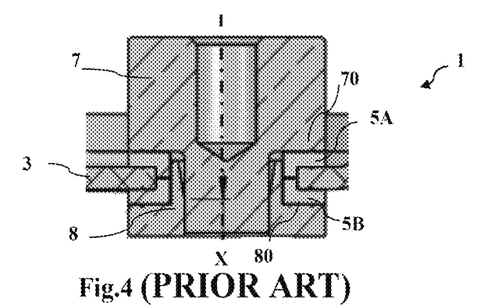
FIG. 4 is a view in axial section of FIG. 3.
Figure 5:
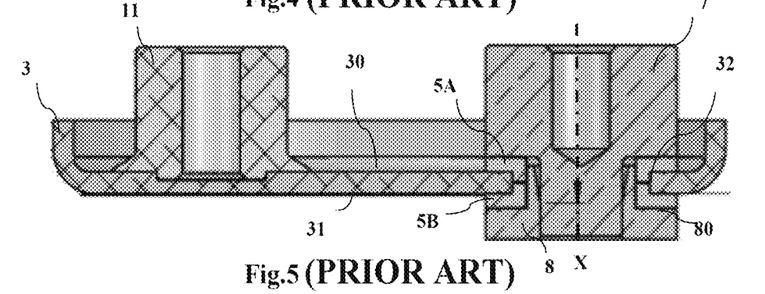
FIG. 5 is a view in axial section of a Li-ion accumulator cover according to the prior art through which the feedthrough according to FIGS. 3 and 4 is produced as the negative terminal, the positive terminal being, for its part, welded directly to the cover.

The feedthrough 1 according to the invention uses all of the components of the feedthrough according to the prior art, described in detail in the preamble and shown in FIG. 4, with the following features in addition:
- the female part 8 is made of grade 1050 aluminum;
- the tight fitting is produced between the protruding portion 71 of the male part 7 and the blind hole 81 of the female part 8.

Thus, the base of the female part 8 is solid, thereby making it possible not only to increase the mechanical strength of the terminal under the effect of the crimping pressure, but also to exclude any direct physical contact between the male part 7 and the materials performing the electrochemistry of the accumulator, which are the active insertion materials and the electrolyte.

The inventors carried out various crimping tests by increasing the thickness E of the base of the female part 8 of the terminal according to the invention.

They were able to observe that, with a type N9p7 tight fitting, i.e. for a portion 71 of the male part having a diameter equal to 6 mm+5 μm/+30 μm and a blind hole 81 of the female part having a bore diameter D of the order of 6 mm−25 μm/0 μm, a thickness E having a value higher than or equal to 2 mm allows the feedthrough 1 to withstand a resulting crimping force, typically of the order of 1.5 tonnes, without the parts 7, 8 mechanically deforming.

By definition, the value of the thickness E of the base of the female part increases with the bore diameter D since the larger this diameter the greater the crimping force must be.

Another important feature for ensuring a strong mechanical connection between male 7 and female 8 parts, after crimping, is the height H of the portion of the blind hole 81 of the female part 8 into which the portion 71 of the male part 7 is tight-fitted.

Thus, the inventors also carried out various tests under pressure with various applied forces for the press-fitting operation by increasing the value of the height H with that of the bore diameter D of the blind hole 81.

The conditions and results of these tests are given in the table below.

| Diameter D in mm | 4 to 5 | 6 | 7 to 8 |
|---|---|---|---|
| Height H in mm | 1.4 to 1.7 | 1.8 to 2.2 | 2.2 to 2.6 |
| Thickness E in mm | ~1 | ~2 | ~3 |
| Crimping force in tonnes | ~1.0 | ~1.5 | 2 to 2.5 |

To produce a feedthrough according to the first example according to the invention, the following steps are carried out.

One of the guide portions 51A, MB of the washers 5A, 5B is inserted through the aperture 32, from each of the two faces 30, 31 of the cover 3, such that they bear against the edge of the aperture 32.

The female part 8 is inserted, from the lower face 31 of the cover 3, into the lower washer 5B.

The male part 7 is press-fitted from the upper face 30 that is opposite the lower face 31 of the cover 3. The press-fitting operation allows the protruding portion 71 of the male part 7 to be tight-fitted into the blind hole 81 of the female part 8 and each of the bearing portions 70, 80 of the male 7 and female 8 parts to bear superficially with pressure against a bearing portion 50A, 50B of the washers 5A, 5B that is itself guided by the edge of the aperture 32.

Figure 8:
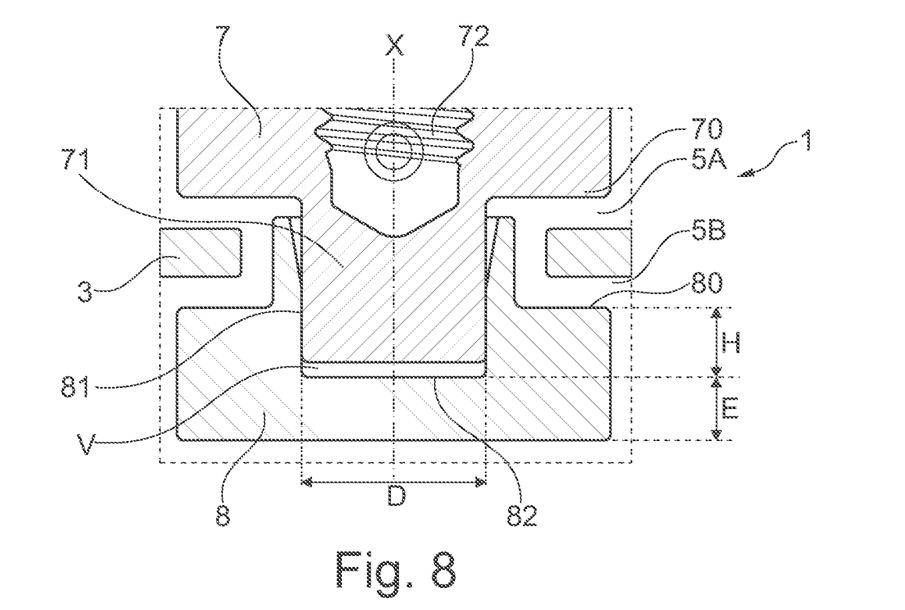
FIG. 8 is a reproduction of a photograph in section of a feedthrough according to the invention according to FIG. 6 with the male part made of 5754 aluminum and the female part made of 1050 aluminium.
Figure 9:
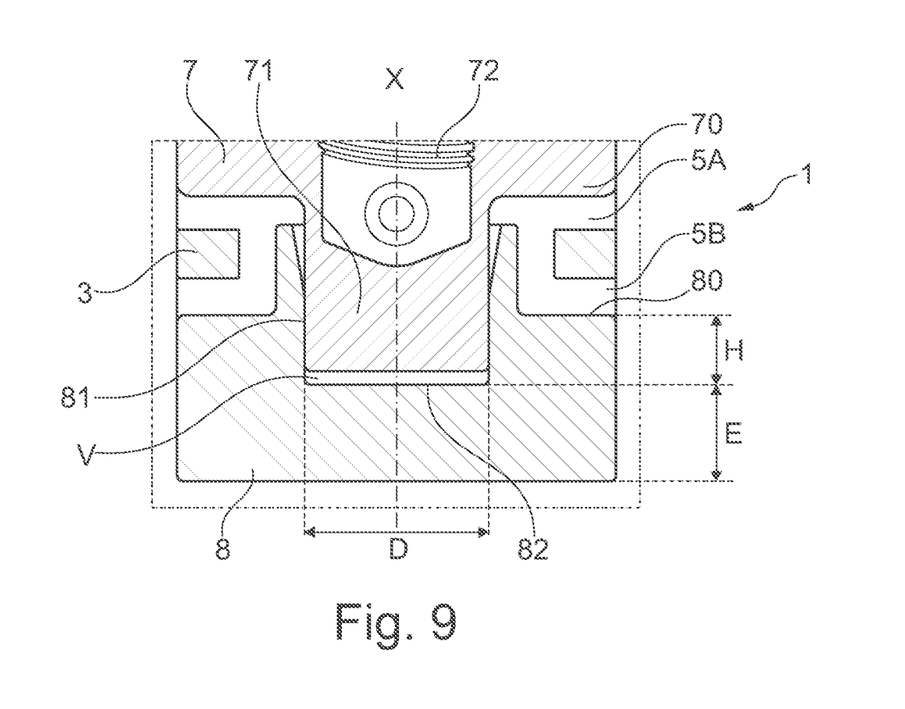
FIG. 9 is a reproduction of a photograph in section of a feedthrough according to the invention according to FIG. 6 with the male part made of CuAl copper and the female part made of 1050 aluminium.
Figure 10:
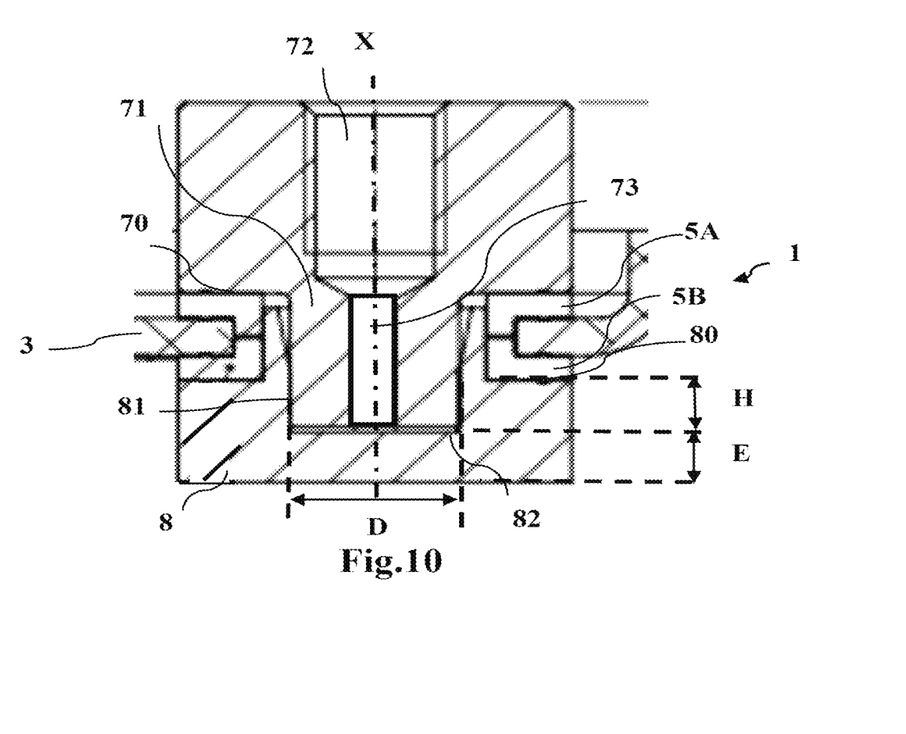
FIG. 10 is a view in axial section of a feedthrough forming a terminal of a metal-ion accumulator according to a second example of the invention.
Figure 11:
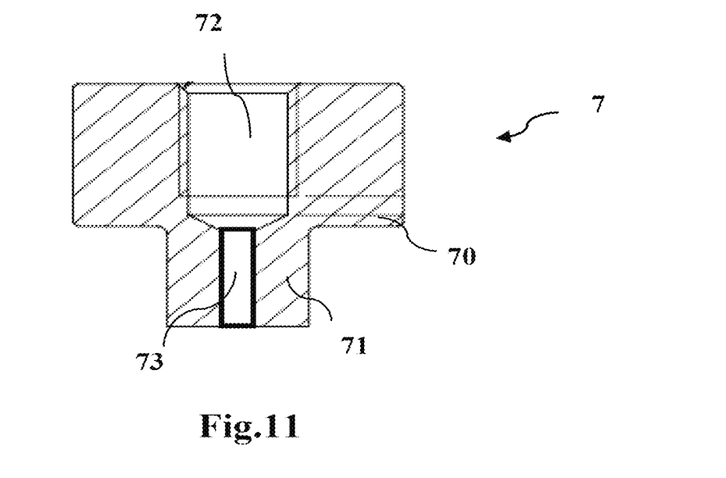
FIG. 11 is a view in axial section of the male part of the terminal according to FIG. 10.

Sections of feedthroughs according to the first example of the invention were made. FIG. 8 is a photographic reproduction of a section with a male part 7 made of grade 5754 aluminum and a female part 8 made of grade 1050 aluminum, while FIG. 9 shows a feedthrough with a male part 7 made of CuAl copper and a female part 8 made of grade 1050 aluminum.

As can be seen in these sections, an incompressible airspace V, corresponding to a chamber located between the end of the portion 71 of the male part and the bottom 82 of the blind hole 81 of the female part 8, remains.

To remove this chamber, the effect of which may be to prevent a completely tight fit from being obtained, the inventors produced a feedthrough 1 by drilling, in the continuation of the tapped portion 72 of the male part 7, an additional through-duct 73. This duct 73, shown schematically in FIGS. 10 and 11, thus allows the air to be let out when crimping the male part 7 into the female part 8.

Figure 13:
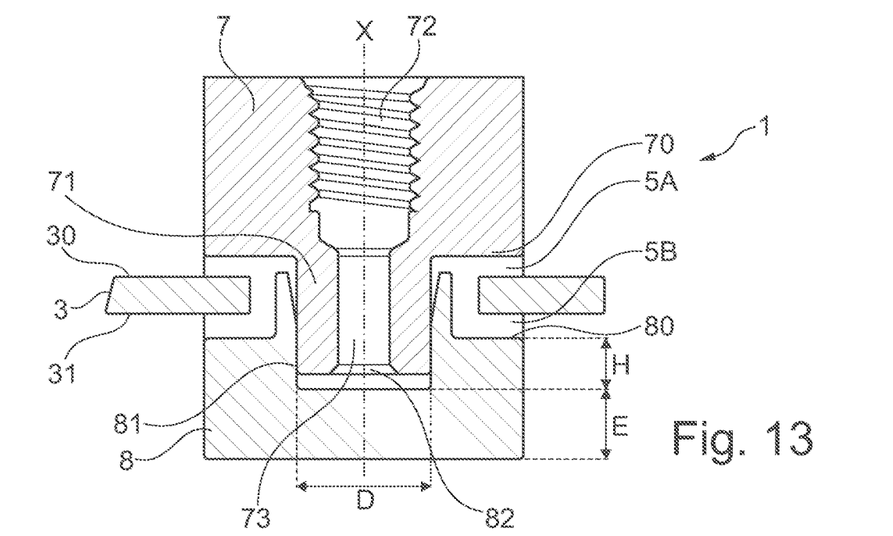
FIG. 13 is a reproduction of a photograph in section of a feedthrough according to the invention according to FIG. 10 with the male part made of CuAl copper and the female part made of 1050 aluminium.
Figure 14A:
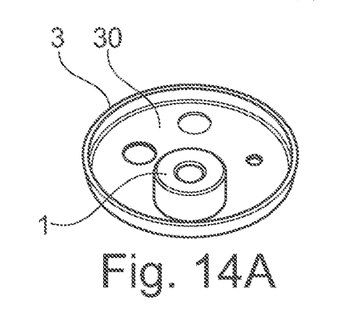
FIGS. 14A and 14B are views in perspective, respectively, of the top and of the bottom of a cover of circular section that is intended to be attached to a housing of a metal-ion accumulator, the cover incorporating a sealtight feedthrough according to the invention as the output terminal of one polarity.
Figure 14B:
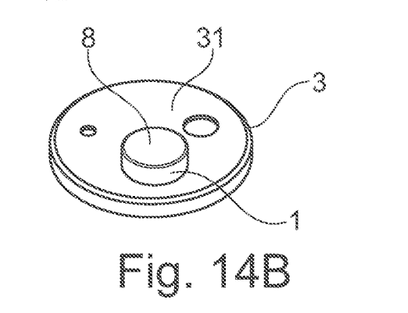
Figure 15:
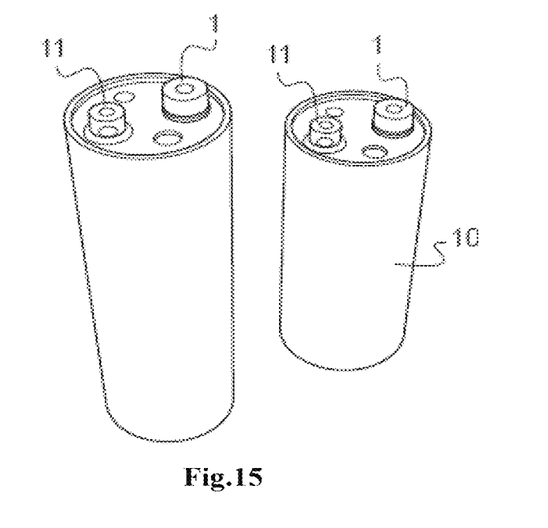
FIG. 15 is a view in perspective of a cylinder-shaped metal-ion accumulator housing, with a cover through which a feedthrough forming a terminal according to the invention is produced.

To verify the effectiveness of the additional through-duct 73, a section was made: it is shown in FIG. 13 in which it is clearly seen that the clearance between the lower end of the portion 71 of the male part 7 and bottom 82 of the blind hole 81 has been decreased as much as is possible, thereby allowing the crimping force that has to be brought to bear to be better controlled and thus the quality of the tight fit obtained between the two parts 7, 8 to be improved.

Figure 12:
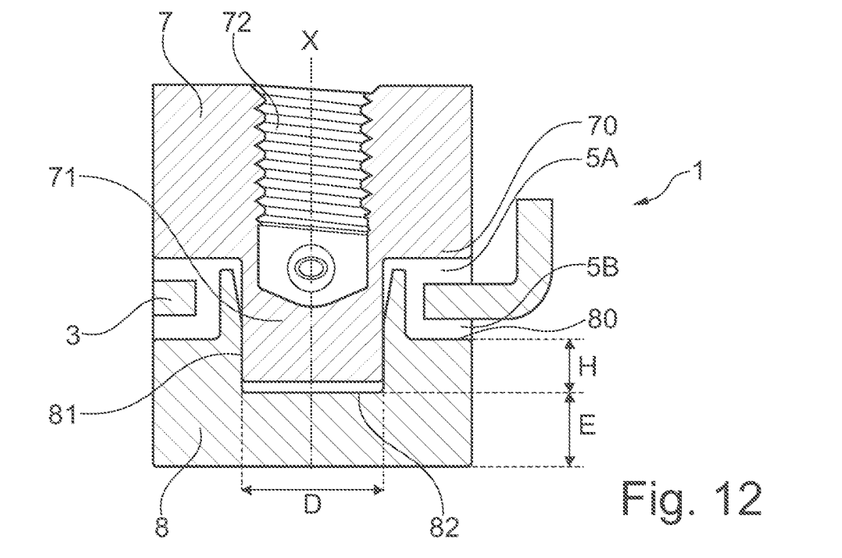
FIG. 12 is a reproduction of a photograph in section of a feedthrough according to the invention according to FIG. 6 with the male part made of CuAl copper and the female part made of 1050 aluminium.

By way of comparison, the same crimping conditions were produced for a feedthrough 1 with identical parts 7, 8, according to the first example of the invention, i.e. without the duct 73; the feedthrough 1 is shown in FIG. 12. The presence of the incompressible space V is again discernible.

Figure 16:
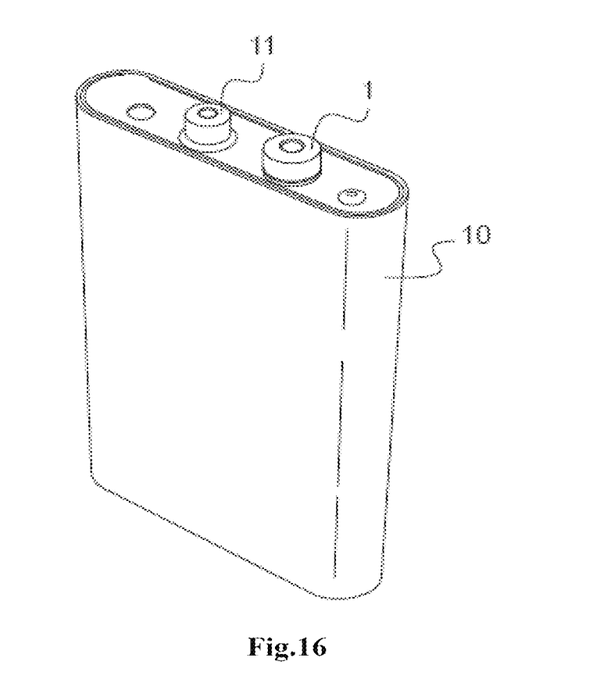
FIG. 16 is a view in perspective of a prism-shaped metal-ion accumulator housing, with a cover through which a feedthrough forming a terminal according to the invention is produced.

The feedthrough 1 according to the invention may be produced on a metal-ion accumulator housing 10 cover 3 both with a cylindrical geometry (FIGS. 14A, 14B, 15) and with a prismatic geometry (FIG. 16). In these various configurations, the terminal 1 according to the invention is for example negative, the positive terminal 11 being able to be produced, for example directly by welding, on the cover 3.

Although not specified above, it is ensured that the area of the solid base of the female part 8 is sufficient to be able to electrically connect an interconnect inside the housing and itself electrically connected to the electrochemical bundle consisting of one or more electrochemical cells. The electrical connection between aluminum-based internal interconnect and solid base of the aluminum female part 8 may be made by welding.

The invention is not limited to the aforementioned examples; in particular, features of the illustrated examples may be combined in variants that have not been illustrated.

Unless otherwise indicated, the expression "including a(n)" should be understood as being synonymous with "including at least one".

The invention claimed is:

1. A feedthrough forming a terminal for a metal-ion electrochemical accumulator, provided through an aperture opening out on either side of a wall including two opposite faces, including:
an electrically conductive male part; and
a female part made of an aluminum-based alloy, a portion of the male part being tight-fitted into a blind hole of the female part,
wherein the male part is made of an aluminum-based alloy that is different from that of the female part.

2. The feedthrough as claimed in claim 1, including:
two electrically insulating washers, each including a bearing portion superficially bearing against one of the faces of the wall and a guide portion protruding with respect to the bearing portion and making contact with the edge of the aperture,
in which feedthrough each of the conductive male and female parts includes a bearing portion superficially bearing against a bearing portion of the washers.

3. A method for producing a feedthrough as claimed in claim 2, wherein the following steps are carried out:
a/ inserting, through the aperture, from each of the two opposite faces of the wall, one of the guide portions of the washers such that they bear against the edge of the aperture in the wall;
b/ inserting, from one face of the wall, the aluminum female part into one of the washers;
c/ press-fitting, from the opposite face of the wall, the male part such that the portion of the male part abuts against the bottom of the blind hole of the female part and such that each of the bearing portions of the male and female parts superficially bears against a bearing portion of the washers that is itself guided against the edge of the aperture.

4. The method as claimed in claim 3, the press-fitting operation in step c/ being carried out by pressing with a force that is greater than or equal to 1 tonne-force so as to obtain a type N9p7 fitting between portion of male part and blind hole of female part.

5. The feedthrough as claimed in claim 1, the aluminum alloy of the male part being chosen from grade 5754, 6060 and 3003 alloys with an H18 temper, the aluminum alloy of the female part being a grade 1050 alloy.

6. The feedthrough as claimed in claim 1, the tight fitting of the portion of the male part in the blind hole of the female part is a type N9p7 fitting.

7. The feedthrough as claimed in claim 1, the one or more materials of the parts and the dimensions of the cross sections of the parts being suitable for allowing an electric current up to a value that is equal at least to 100 A to pass.

8. The feedthrough as claimed in claim 1, the portion of the male part comprising at least one duct opening out both on the outside of the accumulator and on the bottom into the blind hole of the female part, in such a way as to let air out when crumping the male part into the female part.

9. The feedthrough as claimed in claim 1, the thickness of the female part measured between the bottom of the blind hole and the base of the female part being greater than or equal to 2 mm for a bore diameter of the blind hole of the order of 6 mm.

10. A metal-ion accumulator or battery including a housing with a cover through which a feedthrough as claimed in claim 1 is produced.

11. The metal-ion accumulator or battery as claimed in claim 10, the male part being an internally threaded part and protruding toward the outside of the housing.

12. The metal-ion accumulator or battery as claimed in claim 11, the cover being made of aluminum.

13. The metal-ion accumulator or battery as claimed in claim 11, the female part of the feedthrough being welded to an aluminium-based current collector which is itself welded to an aluminium-based electrode foil bearing an active metal-ion insertion material.

14. The metal-ion accumulator or battery as claimed in claim 13, the active metal-ion insertion material chosen from a material based on titanate.

* * * * *